United States Patent [19]

Winterton et al.

[11] Patent Number: 4,954,287

[45] Date of Patent: Sep. 4, 1990

[54] CHLOROFLUOROHYDROCARBON COMPOSITIONS

[75] Inventors: Neil Winterton, Pantasaph; John G. Carey, Warrington, both of United Kingdom

[73] Assignee: Imperial Chemical Industries PLC, London, United Kingdom

[21] Appl. No.: 176,763

[22] Filed: Apr. 1, 1988

[30] Foreign Application Priority Data

Apr. 3, 1987 [GB] United Kingdom ................. 8707962

[51] Int. Cl.$^5$ ..................... C09K 3/00; C08G 18/14; C07C 17/42
[52] U.S. Cl. .................. 252/182.26; 252/182.24; 252/182.27; 252/401; 570/111; 570/122
[58] Field of Search ................ 252/182.24, 182.26, 252/401, 182.27; 570/111, 122

[56] References Cited

U.S. PATENT DOCUMENTS

| 2,094,367 | 9/1937 | Missbach | 570/111 |
| 2,387,284 | 10/1945 | Ohlmann | 570/111 |
| 3,183,192 | 5/1965 | Bauer | 252/188.3 |
| 3,297,582 | 1/1967 | Pawlyk | 252/188.3 |
| 4,483,974 | 11/1984 | Grögler et al. | 252/188.31 |
| 4,624,970 | 11/1986 | Dwyer et al. | 252/182 |
| 4,654,376 | 3/1987 | Brennan et al. | 252/182 |
| 4,664,015 | 2/1987 | Scaccia et al. | 252/182 |
| 4,714,717 | 12/1987 | Condrigan et al. | 252/182 |
| 4,735,970 | 4/1988 | Sommerfeld et al. | 252/182 |
| 4,758,605 | 7/1988 | Williams | 252/182.24 |

FOREIGN PATENT DOCUMENTS

| 82708 | 7/1978 | Japan | 570/111 |
| 1177079 | 1/1970 | United Kingdom | 570/111 |

*Primary Examiner*—Edward A. Miller
*Attorney, Agent, or Firm*—Cushman, Darby & Cushman

[57] ABSTRACT

Mixtures containing active hydrogen compounds such as polyols and aminoalcohols useful for the production of polyurethane foams and also containing trichlorofluoromethane or 1,1,2-trichloro-1,2,2-trifluoroethane as foam blowing agent, are stabilized against reaction of the active hydrogen compound(s) with the chlorofluorohydrocarbon by incorporating a stabilizing amount of amylene, ortho-(isopropenyl) aniline or diisobutylene.

9 Claims, No Drawings

CHLOROFLUOROHYDROCARBON COMPOSITIONS

This invention relates to chlorofluorohydrocarbon compositions and particularly to compositions comprising trichlorofluoromethane or 1,1,2-trichloro-1,2,2-trifluoroethane containing one or more stabilizers to inhibit reaction of the chlorofluorohydrocarbon with active hydrogen compounds such as alcohols, amines and aminoalcohols.

Chlorofluohydrocarbons and notably trichlorofluorethane are used extensively in industry as blowing agents for polyurethane foams made by reaction of isocyanates with polyester or polyether derivatives containing active hydrogen, principally polyols, and aminopolyols. In addition to the polyester or polyether derivatives, the polyurethane-forming reaction mixture often contains a catalyst which is a low molecular weight amine or aminoalcohol, e.g. triethanolamine. It has become common practice in the industry to mix together all the ingredients of the polyurethane reaction mixture except the isocyanate to provide a single raw material feed for mixing with the isocyanate at the site of polyurethane formation. This involves storing and often transporting a mixture of blowing agent(s), active hydrogen compound and catalyst and usually also water, surfactant(s) and flame retarding additives, and it is sometimes necessary to store the mixture for several weeks or even months.

It is well known, however, that compounds containing active hydrogen, and especially low molecular weight compounds such as alcohols and amines and aminoalcohols, react with some chlorofluorohydrocarbons and this result in discolouration of the mixture containing them and/or the formation of crystalline precipitates in the mixture.

It is desirable therefor to include in the mixture a stabilizer which inhibits reaction between the active hydrogen compounds and the chlorofluorohydrocarbon. The problem of reaction with active hydrogen compounds is especially applicable to trichlorofluoromethane and, to a lesser extent, 1,1,2-trichloro-1,2,2-trifluoroethane.

It has been proposed to stabilize the mixtures with ethylenically unsaturated compounds such as butadiene, styrene, alpha-methyl styrene, para-methyl alpha-methyl styrene and 1-alkenes containing up to about 18 carbon atoms. Of these proposed stabilizers, one of the most effective is alpha-methyl styrene and this compound is commonly used in practice. However, whilst it is an efficient stabilizer, alpha-methyl styrene suffers from the disadvantage that it has an unpleasant odour which is offensive to the polyurethane producers.

An odourless or essentially odourless stabilizer which has been proposed recently is the mixture obtained by dimerization of alpha methyl styrene and comprising a mixture of three isomeric dimers, 2,4-diphenyl-4-methylpent-1-ene, 2,4-diphenyl-4-methylpent-2-ene and 1,1,3-trimethyl-3-phenylindane. It is believed that the effective isomer in the mixture is the terminal olefin, 2,4-diphenyl-4-methylpent-1-ene. This stabilizer mixture is similar to alpha-methyl styrene in stabilization efficiency but is not very readily available and is much more expensive than alpha-methyl styrene.

Moreover, the dimer of alpha-methyl stryrene and alpha methyl styrene itself, although imparting sufficient stability to mixtures of blowing agents and active-hydrogen compounds for most practical purposes of storage up to a few weeks, still leave something to be desired in terms of long range stability, e.g. on storage of the mixtures for several months.

The present invention is based on the discovery of stabilizers which are at least as good as the stabilizers used hitherto in terms of short or medium range storage stability but are better than the stabilizers used hitherto in terms of long range storage stability.

According to the present invention there is provided a chlorofluorohydrocarbon composition comprising trichlorofluoromethane or 1,1,2-trichloro-1,2,2-trifluoroethane stabilized against reaction with active hydrogen compounds, notably alcohols, amines and aminoalcohols, by incorporating therein a stabilizing amount of a stabilizer selected from amylene. ortho-(isopropenyl) aniline and diisobutylene.

The chlorofluoroalkane composition is especially suitable for use as the blowing agent in making polyurethane foams where it is mixed with active-hydrogen compounds such as polyester and polyether derivatives e.g. polyols and polyamines and catalysts such as alcoholamines, e.g. triethanolamine. According to a further feature of the invention, therefore, there is provided a mixture containing one or more active hydrogen compounds and trichlorofluoromethane or 1,1,2-trichloro-1,2,2-trifluoroethane and having incorporated therein a stabilizing amount of a stabilizer selected from amylene, ortho-(isopropenyl) aniline and diisobutylene.

It will be appreciated that the invention embraces a process for stabilizing trichlorofluoromethane or 1,1,2-trichloro-1,2,2-trifluoroethane against reaction with active-hydrogen compounds and a process for stabilizing mixtures of trichlorofluoroethane or 1,1,2-trichloro-1,2,2-trifluoro ethane with active hydrogen compounds, which processes comprise incorporating in the chlorofluorohydrocarbon and/or in the mixture a stabilizing amount of a stabilizer selected from amylene, ortho-(isopropenyl) amiline and diisobutylene.

The amount of the stabiliszer incorporated in the chlorofluorohydrocarbon or in the mixture may vary within a wide range, for example from 0.05% to 5% by weight based on the weight of the chlorofluorohydrocarbon. Usually the amount of the stabilizer will be from 0.5% to 2% by weight, typically less than 1% by weight, of the chlorofluorohydrocarbon.

The invention is illustrated by the following examples:

EXAMPLE 1

Samples of trichlorofluoromethane containing 1% by weight of stabilizers were prepared as follows:

Stabilizer

A: amylene
B: ortho-(isopropenyl)aniline
C: diisobutylene
D: dimer of alpha-methyl styrene
E: alpha-methyl styrene
Comparison (F): NONE The samples were used to prepare compositions of the following formulation for use in an accelerated ageing test:

|   | Parts by weight |
| --- | --- |
| TCCP (a polyester polyol) | 30 |
| Water | 2 |

-continued

|  | Parts by weight |
|---|---|
| Triethanolamine | 15 |
| Samples A–F | 55 |

The resulting mixtures were allowed to stand in sunlight (during the day time) and each was examined at intervals of time according to Table 1. The mixtures separated on standing into two layers, the uppermost layer comprising a solution of triethanolamine in water. Examination of the mixtures was visually for colouration in the uppermost layer and for the appearance of salt crystals at the interface between the two layers. The results are shown on Table 1

TABLE 1

| Composition | Time | | | |
|---|---|---|---|---|
|  | 4 days | 7 days | 10 days | 28 days |
| A1 | — | SY | SY | Y-CR |
| B1 | — | *SY | SY | SY |
| C1 | — | SY | SY | SY-CR |
| D1 | — | SY | SY-CR | Y-CR |
| E1 | — | SY | SY-CR | Y-CR |
| F1 | — | SY | Y-CR | Y-CR |

SY = slightly yellow discolouration
CR = salt crystals observed.

The results in Table 1 show that:
(i) up to a period of 4 days, none of the compositions exhibited signs of instability, including the unstabilized composition F1.
(ii) after 7 days, each of the compositions had a slightly yellow discolouration.
* In this connection, stabilizer B is itself a pale yellow colour and yields a solution of very pale yellow colouration; discolouration in this case denotes an increase in colour intensity.
(iii) after 10 days, compositons A1, B1 and C1 (stabilizer/amylene, ortho-(isopropenyl) aniline and diisobutylene respectively) showed improved stability compared with composition D1, E1 and F1 (stabilizers=AMS dimer, AMS and NONE respectively).
(iv) after 10 days, compositions D1 and E1 (AMS dimer and AMS) were only slightly more stable than composition F1 (unstabilised) in that salt crystals had appeared in each composition.
(v) after 24 days, composition B1(ortho(isopropenyl) aniline) remained free from salt crystals and compositon C1 (diisobutylene) was less discoloured than compositions D1, E1, and F1.
(vi) having regard to (iii) and (v), amylene, ortho-(isopropenyl) aniline and diisobutylene are better long-term stabilizers of the mixture than are AMS dimer and AMS.

EXAMPLE 2

The experiments described in Example 1 were repeated except that a few gms of mild steel turnings were added to each of the compositions at the start of the ageing test. The results are shown in Table 2.

TABLE 2

| Composition | Time | | | | |
|---|---|---|---|---|---|
|  | 45 hrs | 4 days | 7 days | 10 days | 28 days |
| A1 (+MS) |  | SY | SY | SY | Y-CR |
| B1 (+MS) |  | SY | SY | SY | Y |
| C1 (+MS) |  | SY | SY | SY | Y-CR |
| D1 (+MS) |  | SY | SY | Y-CR | Y-CR |
| E1 (+MS) |  | SY | SY to Y | Y-CR | Y-CR |
| F1 (+MS) | Y-CR | Y-CR | Y-CR | Y-CR | Y-CR |

EXAMPLE 3

The experiments described in Examples 1 and 2 were repeated except that the compositions were stored in the dark instead of being exposed to day-time sunlight.
In all the experiments, including those where a stabilizer was not employed, the compositions showed no visible evidence of instability after 28 days.

CONCLUSION

The conclusion from the experiments in Examples 1 and 2 is that in terms of decreasing effectiveness as stabilizers for the mixture tested, the stabilizers ranked:
Ortho-(isopropenyl) aniline
diisobutylene
amylene
dimer of alpha-methyl styrene/ alpha-mehthyl styrene

We claim:
1. A chlorofluorohydrocarbon composition comprising trichlorofluoromethane or 1,1,2-trichloro-1,2,2-trifluoroethane stabilized against reaction with active hydrogen compounds by incorporating therein a stabilising amount of ortho(isopropenyl) aniline.
2. A composition as claimed in claim 1 wherein the amount of the stabilizer is from 0.05% to 5% by weight based on the chlorofluorohydrocarbon.
3. A mixture which is reactive with a polyisocyanate to yield polyurethane foam comprising one or more active hydrogen compounds and trichlorofluoromethane or 1,1,2-trichloro-1,2,2-trifluoroethane having incorporated therein a stabilising amount of a stabilizer selected from amylene, ortho-(isopropenyl)aniline and diisobutylene.
4. A mixture as claimed in claim 3 wherein the amount of the stabilizer is from 0.05% to 5% by weight based on the chlorofluorohydrocarbon.
5. A mixture as claimed in claim 3 which contains as an active hydrogen compound a polyol useful for reaction with a polyisocyanate to yield a polyurethane foam.
6. A mixture as claimed in claim 3, which contains as an active hydrogen compound an aminoalcohol.
7. A mixture as claimed in claim 6 comprising a polyester polyol, triethanolamine and trichlorofluoromethane having incorporated therein a stabilizing amount of amylene.
8. A process for stabilizing trichlorofluoromethane or 1,1,2-trichloro-1,2,2-trifluoroethane against reaction with active hydrogen compounds which comprises incorporating in the chlorofluorohydrocarbon a stabilizing amount of ortho-(isopropenyl) aniline.
9. A process for stabilizing a mixture of one or more active hydrogen compounds with trichlorofluoromethane or 1,1,2 trichloro-1,2,2-trifluoroethane which comprises incorporating in the chlorofluorohydrocarbon a stabilizing amount of ortho-(isopropenyl) aniline.

* * * * *